ABSTRACT OF THE DISCLOSURE

A silicone wax useful in cosmetics is an organosilicon block copolymer. The organosilicon block copolymer contains blocks of polysiloxanes of the formula $$[(CH_3)_2SiO]_x[(C_6H_5)(CH_3)SiO]_y[(CH_3)SiO_{3/2}]_z$$

where $x+y+z$ is 6–150 and blocks of $$R_n(C_6H_5)_mSiO_{\frac{4-m-n}{2}}$$

units where R is an alkyl radical of 16 to 26 carbon atoms and $m+n$ is 0.95–1.05.

---

This invention is related to a silicone wax. More specifically, this invention is related to a silicone wax which is essentially an organosilicon block copolymer and which possesses unique properties.

An object of the present invention is to provide a silicone wax.

Another object is to provide a silicone wax which is insoluble in water, in hot fats and oils and in alcohols.

Another object is to provide a silicone wax which will have a relatively high melting point.

Another object is to provide a silicone wax which is compatible with silicone fluids.

Another object is to provide a silicone wax for cosmetics.

Other objects and advantages will be apparent from the following description of the present invention.

The present invention relates to a silicone wax consisting essentially of an organosilicon block copolymer consisting essentially of (A) 5 to 94 mol percent of blocks of polysiloxanes of the structure $$[(CH_3)_2SiO]_x[(C_6H_5)(CH_3)SiO]_y[(CH_3)SiO_{3/2}]_z$$

where the sum of $x+y+z$ has an average value of from 6 to 150, and $y$ and $z$ each have a value of up to 5 mol percent of the sum of $x+y+z$ and (B) 6 to 95 mol percent blocks of the average unit formula $$R_nSiO_{\frac{4-m-n}{2}}^{(C_6H_5)_m}$$

where R is an alkyl radical containing from 16 to 26 carbon atoms, $m$ has a value of up to 0.25, $n$ has a value of from 0.75 to 1.05, and the sum of $m+n$ has a value of from 0.95 to 1.05.

The silicone wax of the present invention is essentially composed of two types of organosilicon blocks. The diorganopolysiloxane blocks (A), are composed essentially of dimethylsiloxane units and have an average of from 6 to 150 silicon atoms per block. Organosilicon block copolymers containing diorganopolysiloxane blocks with an average of less than 6 silicon atoms per block do not produce waxes which are compatible with silicone fluids. Organosilicon block copolymers containing diorganopolysiloxane block with an average of more than 150 silicon atoms per block provide products which do not have wax properties. The most preferred average length of the diorganopolysiloxane blocks is from 15 to 100. The diorganopolysiloxane blocks can tolerate up to 5 mol percent of either phenylmethylsiloxane units or monomethylsiloxane units. More than 5 mol percent of either of the above units reduces the melting point of the wax below an operable level or interferes with the compatibility of silicone fluids.

The other type of organosilcon blocks are the monoorganosilicon blocks (B). The monoorganosilicon blocks, (B), have the average unit formula $$R_nSiO_{\frac{4-m-n}{2}}^{(C_6H_5)_m}$$

where R is an alkyl radical containing from 16 to 26 carbon atmos, $m$ has a value up to 0.25, $n$ has a value from 0.75 to 1.05 and the sum of $m+n$ has a value from 0.95 to 1.05. R is an alkyl radical having 16 to 26 carbon atoms per radical. Examples of alkyl radicals which are operable are hexadecyl, heptadecyl, octadecyl, nonadecyl, eicosyl, heneicosyl, docosyl, tricosyl, tetracosyl, pentacosyl and hexacosyl. The alkyl radicals can be either straight chained or branched.

The preferred alkyl radicals, especially for the preparation of silicone waxes for cosmetics, are those having from 18 to 26 carbon atoms per radical.

The monoorganosilicon blocks, (B), can have up to 0.25 phenyl radicals per silicon atom, and preferably (B) contains up to 0.10 phenyl radicals per silicon atoms. The phenyl radicals can be present as monophenylsiloxane units, diphenylsiloxane units or units of the formula $R(C_6H_5)SiO$. The phenyl radicals are present preferably as monophenylsiloxane units. Units of the diorganosiloxane type such as $(C_6H_5)_2SiO$, $R(C_6H_5)SiO$ and $R_2SiO$ can be present up to 5 mol percent of the total siloxane units of (B). More than 5 mol percent of diorganosiloxane units lowers the melting point below an operable range.

The monoorganosilicon blocks, (B), can have up to 5 mol percent of siloxane units of $SiO_2$ based on the total mol percent of siloxane units in (B). Up to 5 mol percent of $SiO_2$ units aids in raising the melting point of the silicone wax and adds strength to the silicone wax. More than 5 mol percent of $SiO_2$ units causes the silicone wax to become brittle.

The monoorganosilicon blocks, (B), contain from 75 to 100 mol percent of monoalkylsiloxane units based on the total number of units present in (B). The most preferred amount of monoalkylsiloxane units is from 90 to 100 mol percent.

The siloxane units in the siloxane blocks in (A) can be present in amounts from 5 to 94 mol percent based on the total mol percent of siloxane units in (A) and (B). The most preferred amount of siloxane units (A) is from 20 to 90 mol percent. The amount of siloxane units in the blocks of (B) can be from 6 to 95 mol percent based on the total mol percent of siloxane units in (A) and (B). Copolymers outside the limits of (A) and (B), as stated above, do not produce operable waxes.

The organosilicon block copolymer is essentially the only component of the silicone wax, but because the starting alkyl chlorosilanes are extremely difficult to prepare in pure form, other materials are present such as alkanes with from 16 to 26 carbon atoms. These extra ingredients are not detrimental to the properties of the silicone waxes if the amounts present are relatively small.

The organosiloxane block copolymers of the present invention can be prepared by several methods. In one excellent method silanes, such as $RSiCl_3$, are coupled with $HO[Me_2SiO]_xH$ in the presence of an acid acceptor such as pyridine and an inert organic solvent such as toluene. The silane is present in an amount of at least one $RSiCl_3$ molecule per OH radical in the dimethylpolysiloxane. The chlorosilane can be prepared by any conventional technique such as the addition of an alpha-alkene to HSiCl₃ in the presence of a platinum catalyst. The coupling reaction is usually carried out in the absence of water. The reaction product from the coupling reaction, either with or without removing the pyridine hydrogen chloride which was formed during the reaction, is mixed with additional chlorosilanes such as $RSiCl_3$, $R_2SiCl_2$, $R(C_6H_5)SiCl_2$, $C_6H_5SiCl_3$ or $(C_6H_5)_2SiCl_2$ to produce the desired mol percentage of siloxane units for (B). All of the chlorosilanes can be added during the coupling step or some can be added during the coupling step and the remaining amount just before hydrolysis. The mixture is mixed with water to hydrolyze the chlorosilanes. The amount of water is usually such that a 10 weight percent of hydrogen chloride in water is formed. The concentration of the hydrogen chloride in water is not limited to 10 weight percent but can vary from 1 to 20 weight percent. The hydrolysis is best carried out when some isopropanol is mixed with the water. The amount of isopropanol is not critical. After the hydrolysis the water layer is separated from the organic layer and discarded. The organic layer is washed free of acid by water washes or washes which contain bases such as $Na_2CO_3$. After neutralizing the acid in the organic layer the solvent can be removed by any conventional method, such as vacuum stripping. Conditions which cause siloxane bond rearrangement should not be used.

The organosilicon block copolymer of the present invention is a silicone wax. The wax is insoluble in water, alcohol, and hot fats and oils. It is miscible with silicone fluids. It has a relatively high melting point and has sufficient strength to be molded and formed. The silicone wax is useful in cosmetic preparations.

The silicone wax also finds many uses other than in cosmetics. Other uses are automobile waxes, floor waxes, furniture waxes, shoe polishes and waxes, leather waxes and industrial waxes.

The following examples are illustrative only, and should not be construed as limiting the invention which is properly delineated in the appended claims.

Example 1

An organosilicon block copolymer was prepared by adding a mixture of 100 g. (1.35 mol) of a hydroxylated essentially dimethylpolysiloxane having an average of 44 silicon atoms per molecule and 100 g. of toluene to a solution of 350 g. (0.90 mol) of octadecyltrichlorosilane, 350 g. of toluene and 7 g. of pyridine with continuous agitation.

The solution was then hydrolyzed by mixing with a mixture of 800 cc. of water and 88 cc. of isopropanol. After hydrolysis, the aqueous layer was separated from the organic layer which was then washed until neutral with a 10 percent solution of isopropanol in water. The organic layer was stripped under vacuum to 120° C. And the resulting organosilicon block copolymer was a silicone wax with a melting point of 60° C.

Example 2

When 0.90 mol of hexadecyltrichlorosilane and 1.35 mol of hydroxylated diorganopolysiloxane composed of 98 mol percent dimethylsiloxane units and 2 mol percent monomethylsiloxane units and having an average of 60 silicon atoms per molecule are reacted according to the procedure of Example 1 equivalent results are obtained.

Example 3

An organosilicon block copolymer was prepared by adding a mixture of 37 g. (0.50 mol) of a hydroxyl-endblocked dimethylpolysiloxane having an average of 44 silicon atoms per molecule and 37 g. of toluene to a solution of 12.7 g. (0.033 mole) of octadecyltrichlorosilane, 12.7 g. of toluene and 2.5 g. of pyridine with continuous agitation. A mixture of 84.1 g. (0.217 mol) of octadecyltrichlorosilane, 17.8 g. (0.084 mol) of phenyltrichlorosilane and 100 g. of toluene was added to the above mixture and then hydrolyzed by mixing with 333 g. of water and 34 g. of isopropanol. The aqueous layer was separated from the organic layer which was washed neutral with water. The organic layer was vacuum stripped to 130° C. and the resulting organosilicon block copolymer was a wax with a melting point of 41° C.

Example 4

An organosilicon block copolymer was prepared according to Example 1 in which the amounts used were 8 g. (0.0594 mol) of octadecyltrichlorosilane and 50 g. (0.676 mol) of the dimethylpolysiloxane of Example 1. The product was a wax melting at 40° C. and compatible with dimethylsilicone fluids.

Example 5

A mixture of 50 g. (0.676 mol) of the dimethylpolysiloxane of Example 1 and 50 g. of toluene was added to a mixture of 28 g. (0.132 mol) of monophenyltrichlorosilane, 28 g. of toluene and 4 g. of pyridine with continuous agitation. After the coupling was complete, 130.6 g. (0.337 mol) of octadecyltrichlorosilane in 130 g. of toluene was added to the above mixture and then hydrolyzed according to Example 1. After washing and stripping, the organosilicon block copolymer obtained had a melting point of 55° C.

Example 6

A mixture of 1.85 g. (0.011 mol) of $SiCl_4$ and 2 g. of toluene was added to a mixture of 100 g. (1.35 mol) of the dimethylpolysiloxane of Example 1, 100 g. of toluene and 1 g. of pyridine with continuous agitation. After the coupling was complete, the above mixture was added to a mixture of 186 g. (0.48 mol) of octadecyltrichlorosilane, 186 g. of toluene and 4 g. of pyridine and allowed to agitate for a short time before hydrolyzing, washing and stripping according to Example 1. The organosilicon block copolymer was a wax melting at 48° to 53° C.

Example 7

A silicone wax having a melting point of 60° to 63° C. was prepared according to the procedure of Example 1. The amounts and materials used were 175 g. (0.45 mol) of octadecyltrichlorosilane and 50 g. (0.676 mol) of a hydroxylated essentially dimethylpolysiloxane having an average of 78 silicon atoms per molecule. The amount of toluene and pyridine used was 225 g. and 3.5 g. respectively.

Example 8

A silicone wax having a melting point of 55° to 60° C. was prepared according to Example 7 except the dimethylpolysiloxane had an average of 106 silicon atoms per molecule.

Example 9

(A) A silicone wax having a melting point of 43° to 45° C. was prepared according to the procedure of Example 5. The ingredients and amounts were the same except that the dimethylpolysiloxane had an average of 106 silicon atoms per molecule.

(B) A silicone wax having a melting point of 45° C. was prepared according to the procedure of Example 5. The ingredients and amounts were the same except that the dimethylpolysiloxane had an average of 78 silicon atoms per molecule.

Example 10

The following organosilicon block copolymers were prepared according to the procedure of Example 1. The ingredients and amounts are indicated below.

(A) 157.2 g. (0.405 mol) of octadecyltrichlorosilane and 10 g. (0.135 mol) of the dimethylpolysiloxane of Example 1 gave a silicone wax having a melting point of 50° C.

(B) 236 g. (0.609 mol) of octadecyltrichlorosilane and 5 g. (0.0676 mol) of the dimethylpolysiloxane of Example 1 gave a silicone wax having a melting point of 53° C.

(C) 97.5 g. (0.251 mol) of octadecyltrichlorosilane and 10 g. (0.135 mol) of the dimethylpolysiloxanes of Example 1 gave a silicone wax having a melting point of 48° C.

(D) 30 g. (0.0677 mol) of docosyltrichlorosilane and 7.98 g. (0.1078 mol) of the dimethylpolysiloxane of Example 1 gave a silicone wax having a melting point of 60° to 65° C.

(E) 50 g. (0.1127 mol) of docosyltrichlorosilane and 13.3 g. (0.180 mol) of the dimethylpolysiloxane of Example 1 gave a silicone wax having a melting point of 60° C.

(F) Same ingredients and amounts as Example 1 except the dimethylpolysiloxane fluid had an average of 39 silicon atoms per molecule. The silicone wax had a melting point of 55° C.

Example 11

When the following ingredients are reacted according to the procedure of Example 1, equivalent results are obtained.

(A) 0.5 mol of hexacosyltrichlorosilane, 0.001 mol of hexacosylphenyldichlorosilane and 0.7 mol of a hydroxyl-endblocked diorganopolysiloxane composed of 97 mol percent dimethylsiloxane units and 3 mol percent phenylmethylsiloxane units having an average of 12 silicon atoms per molecule.

(B) 1.2 mols of eicosyltrichlorosilane and 1.0 mol of a hydroxyl-endblocked essentially dimethylpolysiloxane having an average of 93 silicon atoms per molecule.

(C) 0.15 mol of heneicosyltrichlorosilane, 0.002 mol of diphenyldichlorosilane and 0.20 mol of a hydroxyl-endblocked essentially dimethylpolysiloxane having an average of 145 silicon atoms per molecule.

That which is claimed is:

1. A silicone wax consisting essentially of an organosilicon block copolymer consisting essentially of
(A) 5 to 94 mol percent organosiloxy units in blocks of polysiloxanes of the structure $$[(CH_3)_2SiO]_x[(C_6H_5)(CH_3)SiO]_y[(CH_3)SiO_{3/2}]_z$$

where the sum of $x+y+z$ has an average value of from 6 to 150, and $y+z$ each have a value of up to 5 mol percent of the sum of $x+y+z$, and,
(B) 6 to 95 mol percent of blocks of the average unit formula

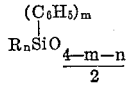

where R is an alkyl radical containing from 16 to 26 carbon atoms, $m$ has a value of up to 0.25, $n$ has a value of from 0.75 to 1.05 and the sum of $m+n$ has a value of from 0.95 to 1.05.

2. A silicone wax in accordance with claim 1 where $y$ and $z$ are 0 and $m$ has a value of 0.

3. A silicone wax in accordance with claim 1 where the siloxane units in (A) are present in amounts from 20 to 90 mol percent and the siloxane units in (B) are present in amounts from 10 to 80 mol percent.

4. A siliocne wax in accordance with claim 1 where $y$ and $z$ are 0.

5. A silicone wax in accordance with claim 1 where R is an alkyl radical containing from 18 to 26 carbon atoms.

6. A silicone wax in accordance with claim 1 where the sum of $x+y+z$ has an average value of from 15 to 100.

7. A silicone wax in accordance with claim 1 where the sum of $x+y+z$ has an average value of from 15 to 100, $m$ is 0, $n$ is 1.0, R is an alkyl radical containing 18 carbon atoms, the siloxane units in (A) are present in amounts from 20 to 90 mol percent and the siloxane units in (B) are present in amounts from 10 to 80 mol percent.

8. A silicone wax in accordance with claim 7 where the siloxane units in (A) are present in an amount of 60 mol percent and the siloxane units in (B) are present in an amount of 40 mol percent.

9. A silicone wax consisting essentially of an organosilicon block copolymer consisting essentially of
(A) 5 to 94 mol percent organsosiloxy units in blocks of essentially dimethylpolysiloxanes where there are an average of from 15 to 100 silicon atoms per molecule, and
(B) 6 to 95 mol percent of blocks of the average unit formula

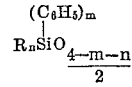

where R is an alkyl radical containing from 16 to 26 carbon atoms, $m$ has a value of up to 0.10, $n$ has a value of from 0.90 to 1.05 and the sum of $m+n$ has a value of from 0.95 to 1.05.

References Cited

UNITED STATES PATENTS

| | | | |
|---|---|---|---|
| 2,483,158 | 9/1949 | Sprung et al. | 260—448.2 |
| 2,486,162 | 10/1949 | Hyde | 260—448.2 XR |
| 3,018,270 | 1/1962 | Toogood | 260—448.2 XR |
| 3,280,214 | 10/1966 | Mitchell | 260—448.2 XR |

TOBIAS E. LEVOW, *Primary Examiner.*

P. F. SHAVER, *Assistant Examiner.*